United States Patent [19]

McCabe

[11] Patent Number: 5,289,640
[45] Date of Patent: Mar. 1, 1994

[54] APPARATUS AND METHOD FOR PREFERENTIALLY SEPARATING VOLATILIZABLE COMPONENTS OF A MATRIX

[75] Inventor: Mark M. McCabe, Lowell, Mass.

[73] Assignee: RETEC/Tetra, LC, The Woodlands, Tex.

[21] Appl. No.: 47,805

[22] Filed: Apr. 15, 1993

Related U.S. Application Data

[63] Continuation-in-part of Ser. No. 683,299, Apr. 10, 1991, Pat. No. 5,216,821.

[51] Int. Cl.$^5$ .................................................. F26B 3/00
[52] U.S. Cl. ........................................ 34/29; 34/72; 34/79; 34/182
[58] Field of Search ............... 34/26, 29, 73, 74, 75, 34/78, 180, 181, 182, 13, 17, 72, 28, 27

[56] References Cited

U.S. PATENT DOCUMENTS

| | | |
|---|---|---|
| 940,945 | 11/1909 | Shepard et al. |
| 2,096,176 | 10/1937 | Harrington ............... 34/12 |
| 2,116,573 | 5/1938 | Harrington ............. 110/15 |
| 2,691,830 | 10/1954 | Karnofsky ............ 34/27 X |
| 3,027,854 | 4/1962 | Akerlund ................ 110/5 |
| 3,518,774 | 7/1970 | Reimer ..................... 34/33 |
| 3,605,273 | 9/1971 | Andersen ................ 34/15 |
| 3,707,129 | 12/1972 | Kawashimo et al. ..... 110/15 |
| 4,089,277 | 5/1978 | Paul ...................... 110/204 |
| 4,156,392 | 5/1979 | Bayeh .................... 110/110 |
| 4,504,222 | 3/1985 | Christian ............... 432/139 |
| 4,726,301 | 2/1988 | Des Ormeaux et al. ..... 110/250 |
| 4,738,206 | 4/1988 | Noland ................... 110/346 |
| 4,985,131 | 1/1991 | Lane ......................... 208/13 |
| 5,005,495 | 4/1991 | Feitel ..................... 110/344 |
| 5,074,057 | 12/1991 | Kanai ....................... 34/179 |
| 5,216,821 | 6/1993 | McCabe et al. ........ 34/181 X |

FOREIGN PATENT DOCUMENTS

WO83/01910 6/1983 PCT Int'l Appl.
323523 12/1929 United Kingdom.

Primary Examiner—Henry A. Bennet
Attorney, Agent, or Firm—Hamilton, Brook, Smith & Reynolds

[57] ABSTRACT

An apparatus and method are disclosed for preferentially separating a high vapor pressure component from a low vapor pressure component, wherein at least a portion of each component is volatilized from a matrix. A matrix, such as a sludge contaminated with volatilizable organic materials, is directed through a housing by a screw conveyor. Heat is applied to the matrix in an amount sufficient to volatilize at least a portion of the high and low vapor pressure components. A portion of a high vapor pressure component volatilizes at an inlet end of the housing while a portion of a low vapor pressure component volatilizes at an outlet end of the housing. The volatilized components are then preferentially separated by a hot gas, which is discharged over the matrix from a gas inlet tube, through separate outlet ports. The volatilizable components of the matrix are thereby preferentially separated.

16 Claims, 3 Drawing Sheets

APPARATUS AND METHOD FOR PREFERENTIALLY SEPARATING VOLATILIZABLE COMPONENTS OF A MATRIX

RELATED APPLICATIONS

This is a continuation-in-part Ser. No. 07/683,299 filed Apr. 10, 1991, now U.S. Pat. No. 5,216,821, which is hereby incorporated by reference.

BACKGROUND OF THE INVENTION

Many wastes, such as sludges and contaminated soils, include a matrix and one or more volatilizable components. For example, sludges generated by industrial processes which include a solid matrix component also often include a volatilizable component which is not suitable for disposal by direct discharge to the environment. In another example, soil can become contaminated by oil, gasoline or other contaminants, such as by leakage from storage vessels or during drilling of oil wells.

One attempt to dispose of such wastes is by containment in sealed land fills. However, seals in land fills can deteriorate and fail, thereby allowing the wastes to leak into the surrounding ground. Further, land-fills generally require large areas of land and availability of suitable land-fill sites is diminishing. In addition, governmental regulation limits the kinds of waste which can be disposed of in land fills. Disposal of wastes has also been attempted by incineration. However, airborne pollutants are typically released into the atmosphere as incinerator exhaust.

Another attempt to dispose of volatilizable component-containing wastes includes volatilization of the volatilizable components. The volatilized components can then be treated separately. Removal of volatilizable components from matrices, however, has often been substantially incomplete because of the relatively low volatility of many volatilizable components. Following volatilization of these relatively low volatility components, quenching, condensation and redeposition of the relatively low vapor pressure components has occurred due to intermixing with relatively high vapor pressure components.

Thus, a need exists for an apparatus and method for removing volatilizable components from matrices which overcome or minimize the above-mentioned problems.

SUMMARY OF THE INVENTION

The present invention relates to a new apparatus and method for preferentially separating a high vapor pressure component from a low vapor pressure component, wherein at least a portion of each volatilizable component is volatilized from a matrix.

The apparatus includes a housing, having a housing inlet and a housing outlet, and a means for conveying the matrix from the housing inlet through the housing to the housing outlet. The apparatus also includes means for volatilizing at least a portion of the high vapor pressure component and the low vapor pressure component of the matrix within the housing. A first gas outlet is disposed at the housing. A second gas outlet is also disposed at the housing and is sufficiently remote from the first gas outlet to enable preferential separation of the volatilized high vapor pressure component from the volatilized low vapor pressure component. Additionally, the apparatus includes a means for preferentially directing the volatilized high vapor pressure component out of the housing through the first gas outlet and for preferentially directing the volatilized low vapor pressure component out of the housing through the second gas outlet, thereby preferentially separating the high vapor pressure component from the low vapor pressure component of the matrix.

The method includes conveying the matrix through a housing from a housing inlet at an inlet end of the housing to a housing outlet at an outlet end of the housing. The matrix is heated to a temperature which is sufficient to volatilize at least a portion of the high vapor pressure component and the low vapor pressure component. The volatilized high vapor pressure component is then preferentially directed out of the housing through a first gas outlet at the housing. The volatilized low vapor pressure component is preferentially directed out of the housing through a second gas outlet, which is disposed at the housing and which is sufficiently remote from the first gas outlet to enable preferential separation of the volatilized high vapor pressure component from the volatilized low vapor pressure component, thereby preferentially separating the volatilized high vapor pressure component from the volatilized low vapor pressure component of the matrix.

This invention has the advantage of preferentially removing at least a portion of a volatilized high vapor pressure component from a volatilized low vapor pressure component of a matrix. Also, redeposition of the volatilized components into the matrix bed or gas outlet piping by steam quenching, or by condensation of the volatilized low vapor pressure component, due to interaction with the volatilized high vapor pressure component is significantly reduced. The preferential separation of the volatilized high vapor pressure component from the volatilized low vapor pressure component by the apparatus and method of the invention also permits the use of smaller downstream components and simplifies subsequent treatment of the discharged vapor effluent.

DETAILED DESCRIPTION OF THE INVENTION

The features and other details of the apparatus and method of the invention will now be more particularly described with reference to the accompanying drawings and pointed out in the claims. The same number present in different figures represents the same item. It will be understood that the particular embodiments of the invention are shown by way of illustration and not as limitations of the invention. The principle features of this invention can be employed in various embodiments without departing from the scope of the invention.

The present invention generally relates to an apparatus and method for preferentially separating at least a portion of a high vapor pressure component from a low vapor pressure component previously volatilized from a matrix.

Figure 1:
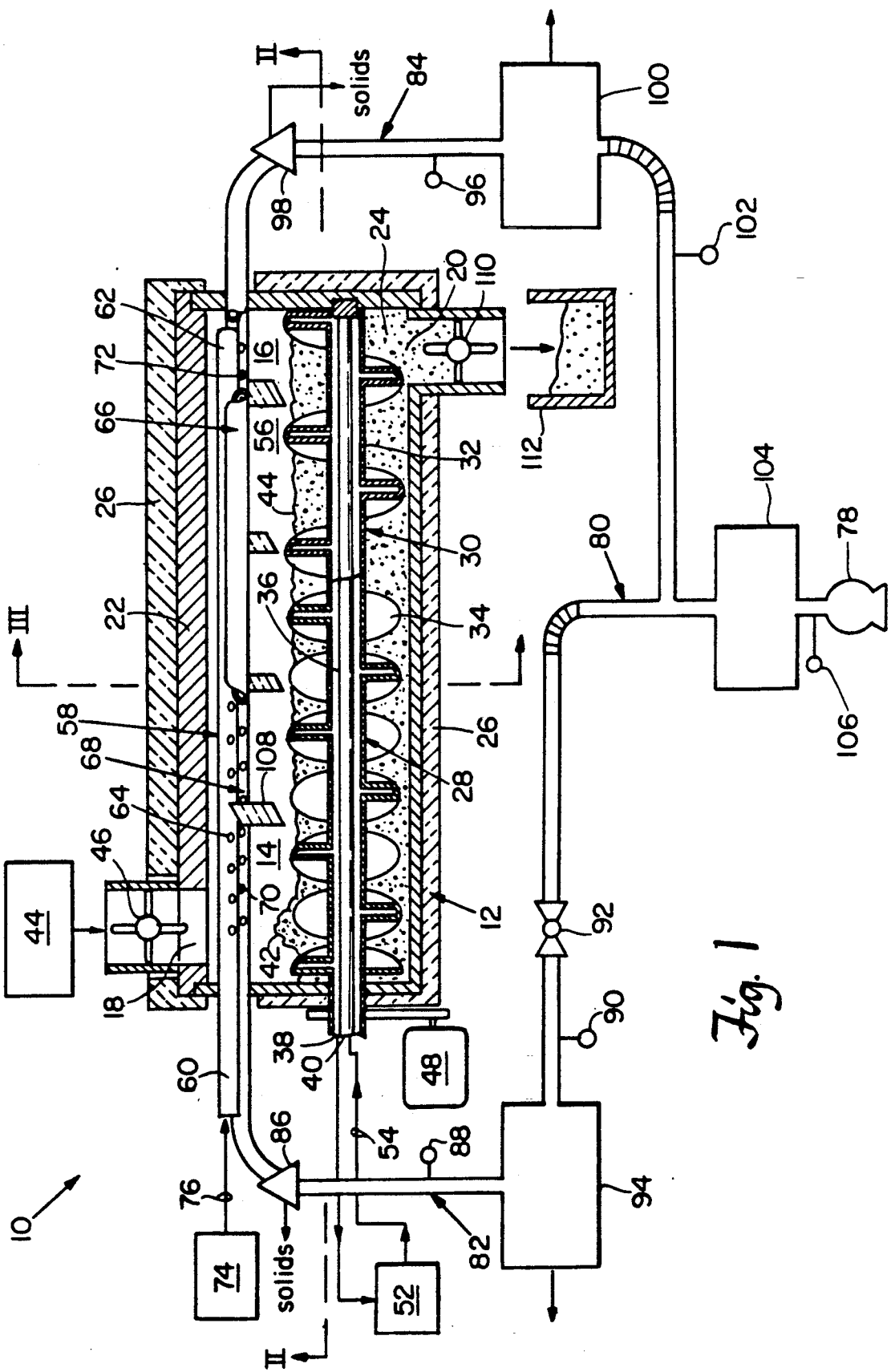
FIG. 1 is a section view of one embodiment of a thermal removal system of the invention.

One embodiment of the invention is illustrated in FIG. 1. Therein, thermal removal system 10 includes housing 12 having inlet end 14 and outlet end 16. Housing inlet 18 is disposed at inlet end 14 and housing outlet 20 is disposed at outlet end 16. Lid 22 is disposed on housing 12. Housing chamber 24 is defined by housing 12 and lid 22. Housing 12 and lid 22 can be insulated by layer 26 to prevent significant heat loss from thermal removal system 10 through housing 12 or lid 22.

Means for conveying a matrix from housing inlet 18 through housing 12 to housing outlet 20 are disposed within housing 12. In one embodiment, the means for conveying the matrix include screw conveyors 28,30. Screw conveyors 28,30 are disposed within housing chamber 20. Each screw conveyor includes a shaft 32 and flights 34 disposed about shaft 32. Additionally, screw conveyors 28,30 each define a conduit 36 extending through shaft 32 and flights 34. Each conduit 36 has an annular conduit inlet 38 and a conduit outlet 40. Screw conveyors 28,30 are identical except that screw conveyors 28,30 are counter-rotating. Screw conveyor 28 is a left-hand screw conveyor and screw conveyor 30 is a right-hand screw conveyor. Alternate suitable means for conveying matrix 42, including, for example, belt conveyors, can also be employed.

Housing 12 and screw conveyors 28,30 are disposed at a slight incline from housing inlet 18 to housing outlet 20 to substantially prevent discharge of matrix which includes an appreciable amount of the volatilizable components from thermal removal system 10. Preferably, the angle to the horizontal of the incline is in the range of between about 1° and 15°.

Housing 12 and screw conveyors 28,30 can be of a suitable screw processor, such as is known in the art. One example of a suitable screw processor is a "Holo-Flite" type screw processor, disclosed in U.S. Pat. No. 2,731,241 and in U.S. Pat. No. 2,753,159. In a particularly preferred embodiment, the screw processor is a D7-10-6 model "Holo-Flite" screw processor, commercially available from Denver Equipment Company.

Volatilizable component-containing matrix 42 is directed from matrix source 44 by feeding means 46 through housing inlet 18 into housing chamber 24. Examples of suitable matrices containing volatilizable components include sludges, contaminated soil, etc. Examples of suitable sludges for removal of volatilizable components from a matrix within the sludge by thermal removal system 10 include oil-refinery sludges, wood treatment sludges, papermill sludges, etc. Examples of volatilizable contaminants of which a portion can be removed from a matrix by thermal removal system 10 include volatilizable organic compounds, such as oils, gasoline, creosotes, transformer fluids, etc.

A high vapor pressure component, as defined herein, is a volatilizable component which will volatilize from a matrix at a relatively low temperature. A low vapor pressure component, as defined herein, is a volatilizable component, which will volatilize from a matrix at a temperature significantly higher than the volatilization temperature of the high vapor pressure component.

In one embodiment, examples of high vapor pressure components include water and organic chemicals which have a vapor pressure greater than or about equal to that of water. Examples of corresponding low vapor pressure components in this embodiment include organic chemicals which have a vapor pressure which is significantly lower than that of water.

The concentration of high vapor pressure and low vapor pressure components is sufficient to enable removal of at least a portion of each of the two volatilizable components from matrix 42 by volatilization in thermal removal system 10. Preferably, the combined concentration of volatilizable components in matrix 42 before volatilization in housing chamber 24 is less than about eighty percent by weight.

Matrix 42 is directed through housing inlet 18 into housing chamber 24 at a rate sufficient to allow at least a portion of each of the two volatilizable components in matrix 42 to be volatilized by heat transferred to matrix 42 from screw conveyors 28,30. In one embodiment, matrix 42 is directed into housing chamber 24 at a rate in the range of between five hundred and about eight thousand pounds per hour.

An example of a suitable feeding means 46 is an air lock, or "double dump," wherein matrix 42 can be directed into housing chamber 24 while maintaining a significant pressure difference between housing chamber 24 and the atmosphere. Typically, housing chamber 24 is maintained at a pressure lower than atmospheric, such as vacuum up to about 0.5 inches water. An example of a suitable air lock is a 18-24-C model air lock, commercially available from Prater Industries.

Screw conveyors 28,30 are in parallel arrangement and are rotated by screw rotating means 48 in opposite directions, whereby matrix 42 at housing inlet 18 is conveyed by rotation of screw conveyors 28,30 from housing inlet 18 to housing outlet 20. Conveyance of matrix 42 through housing chamber 24 causes matrix 42 to form matrix bed 50 within housing chamber 24. In one embodiment, matrix bed 50 has a depth in housing chamber 24 sufficient to submerge a substantial portion of screw conveyors 28,30. Preferably, the tops of flights 34 are elevated about one-half inch above the top of matrix bed 50. Matrix 42 is conveyed through housing chamber 24 at a rate sufficient to allow at least a portion of each of the two volatilizable components to volatilize by transfer of heat from screw conveyors 28,30 to matrix 42. Preferably, screw conveyors 28,30 are rotated at a rate in the range of between about 0.5 and about 10.0 revolutions per minute. In a particularly preferred embodiment, screw conveyors 28,30 are rotated at a rate sufficient to cause matrix 42 to have a residence time in housing chamber 24 in the range of between about 20 minutes and 90 minutes.

Means for volatilizing at least a portion of the high vapor pressure component and the low vapor pressure component of matrix 42 are disposed within housing 12.

In one embodiment, a suitable means for volatilizing the high and low vapor pressure components in matrix 42 is provided by heating screw conveyors 28,30 to a temperature sufficient to volatilize at least a portion of each of the two volatilizable components. A suitable hot medium is directed from hot medium source 52 through hot medium conduit 54 to conduit inlet 38 by a suitable means, such as by operation of a pump, not shown. The hot medium is then directed from conduit inlet 38 through conduit 36 to conduit outlet 40. The rate at which the hot medium is directed through conduit 36 is sufficient to cause turbulent flow of the hot medium and to heat screw conveyors 28,30 to a temperature sufficient to volatilize at least a portion of each of the two volatilizable components from the matrix 42. At least a portion of the high and low vapor pressure components in matrix 42 are thereby volatilized ana enter head space 56, which is defined by housing 12, lid 22, and matrix bed 50. The high vapor pressure component volatilizes substantially at inlet end 14 of housing 12 while the low vapor pressure component, volatilizes at outlet end 16 of housing 12.

A suitable hot medium is a medium which can be heated, without significant degradation, at hot medium source 52 to a temperature sufficient to heat screw conveyors 28,30 to a temperature sufficient to cause screw conveyors 28,30 to volatilize at least a portion of each of the two volatilizable components in matrix 42. Preferably, the hot medium is a liquid, such as an oil or a eutectic salt solution.

In one embodiment, the medium is heated to a temperature in the range between about 100° C. and about 600° C. The medium can be heated by a suitable heating means, not shown, such as is known in the art.

Gas inlet tube 58 is disposed in head space 56 and includes gas inlet end 60 and sealed end 62. Apertures 64 are defined by gas inlet tube 58 and are disposed at regular intervals along the length of gas inlet tube 58. Gas inlet tube 58 and apertures 64 each have a diameter sufficient to allow a hot gas to be directed through gas inlet tube 58 at a rate sufficient to remove at least a portion of each of the volatilized high and low vapor pressure components from head space 56 at the operating conditions of thermal removal system 10. Preferably, gas inlet tube 58 has a diameter in the range between about 0.125 and about two inches. In a particularly preferred embodiment, wherein housing 12, lid 18, and screw conveyors 28,30 are a D7-10-6 model Holo-Flite screw processor, gas inlet tube 58 has a diameter of about 1.75 inches and apertures 64 of about 3/32 inches. Alternatively, gas inlet tube 58 can define a single slot, not shown, extending along a substantial portion of the length of gas inlet tube 58 rather than define a plurality of apertures 64.

A first gas outlet and a second gas outlet are disposed at housing 12, with the second gas outlet situated at a location which is sufficiently remote from the first gas outlet, to enable the preferential separation of the volatilized high vapor pressure component from the volatilized low vapor pressure component of matrix 42.

In one embodiment, the first and second gas outlets include gas outlet tubes 66,68. Gas outlet tubes 66,68 run along the length of housing 12 from housing inlet 18 to housing outlet 20 and extend outside of housing 12 through housing inlet end 14 and through outlet end 16. The portions of gas outlet tubes 66,68 located in housing 12 are disposed in head space 56 and are substantially parallel to screw conveyors 28,30 and to gas inlet tube 58. Gas outlet tubes 66,68 are disposed on opposite sides of gas inlet tube 58. First and second outlet ports 70,72 are defined by gas outlet tubes 66,68 at regular intervals along the length of gas outlet tubes 66,68 inside housing 12. First outlet ports 70 are disposed at inlet end 14 of housing 12 and second outlet ports 72 are disposed at outlet end 16 of housing 12. First and second outlet ports 70,72 are situated proximate to the surface of matrix bed 50. The high and low vapor pressure components volatilized from matrix 42 are directed into gas outlet tubes 66,68 through outlet ports 70,72.

Gas outlet tubes 66,68 and outlet ports 70,72 each have a diameter sufficient to allow at least a portion of the volatilized components in head space 56 to discharge into the gas outlet tubes 66,68 through outlet ports 70,72 proximate to the locations within housing 12 wherein the high and low vapor pressure components volatilized from matrix 42. The preferred diameters of gas outlet tubes 66,68 are four inches outside diameter and of outlet ports 70,72 are five-eighths inches.

Fluid communication is provided between hot gas source 74 and gas inlet tube 58 by hot gas conduit 76 for directing a suitable hot gas from hot gas source 74 through hot gas conduit 76 into gas inlet tube 58. Suitable gases are gases which are sufficiently stable to transport the two volatilized components within head space 56 without significant reaction with the two volatilizable components. Examples of suitable gases include steam, carbon dioxide, nitrogen, etc. Preferably, the hot gas is a substantially inert gas, such as nitrogen.

The temperature of the hot gas is sufficient to prevent significant condensation of the high or low volatilized vapor pressure components in gas outlet tubes 66,68. Preferably, the temperature of the hot gas is in the range between about 315° C. and about 540° C. The rate at which hot gas is directed into gas inlet tube 58 is sufficient to cause the hot gas to pass across matrix bed 50 at a rate sufficient to remove at least a portion of the two volatilized components from head space 56. In a particularly preferred embodiment, the hot gas is nitrogen which is directed into gas inlet tube 58 at a rate of about thirty cubic feet per minute, a pressure of between thirty and eighty psig, and a temperature of about 540° C.

The hot gas is directed by a suitable delivery means from hot gas source 74 through hot gas conduit 76 and into gas inlet tube 58 through gas inlet end 60. An example of a suitable delivery means includes a suitable pressurizing means, not shown, such as is known in the art, for applying pressure to hot gas at hot gas source 74. The hot gas is then directed through apertures 64 of gas inlet tube 58 into head space 56 along at least a substantial portion of the length of housing 12. Hot gas directed into head space 56 passes across the top of matrix bed 50 to gas outlet tubes 66,68. The volatilized components in head space 56 are then transported by the hot gas to gas outlet tubes 66,68 and through outlet ports 70,72 into gas outlet tubes 66,68.

The two volatilized components in matrix 42 are directed through outlet ports 70,72 into gas outlet tubes 66,68 by reducing the pressure within gas outlet tubes 66,68 to less than the pressure within head space 56. The pressures within gas outlet tubes 66,68 are reduced by providing fluid communication between gas outlet tubes 66,68 and a suitable vacuum means for applying vacuum to gas outlet tubes 66,68, such as vacuum pump 78, through header 80. The volatilized high vapor pressure component is preferentially directed into gas outlet tubes 66,68 through a first outlet port 70, which is disposed at inlet end 14 of housing 12 and the volatilized low vapor pressure component is preferentially directed through a second outlet port 72, which is disposed at outlet end 16 of housing 12.

A means for preferentially directing the volatilized high and low vapor pressure components out of housing 12 through the first and second gas outlets, respectively, is disposed at housing inlet end 18 and housing outlet end 20.

In one embodiment, a suitable means for preferentially directing volatilized components includes header 80, which is disposed outside of housing 12 and includes a wye having two gas discharge lines 82,84. Gas discharge line 82 connects to portions of gas outlet tubes 66,68 which extend outside of housing 12 at inlet end 14. Gas discharge line 84 connects to the portions of gas outlet tubes 62,64 which extend outside of housing 12 at outlet end 16.

Operation of the vacuum pump 78 reduces the pressure in head space 56 by preferentially directing the two volatilized components from the matrix 42 and any other gases present in head space 56 through outlet ports 70,72, into gas outlet tubes 66,68, bi-directionally out of housing 12 through the portions of gas outlet tubes 66,68, extending outside of inlet end 14 and outlet end 16 into gas discharge lines 82,84 of header 80.

Gas discharge lines 82,84 include a separation means, for removing at least a portion of a solid component of the volatilized components discharged from housing 12, a flow-control means, for controlling the relative flow rates of the volatilized components through gas discharge lines 82,84.

In one embodiment, in gas discharge line 82, a suitable separation means is provided by cyclone separators 86, a suitable flow-control means for volatilized components in gas discharge lines includes temperature monitors 88,90 and control valve 92. In addition suitable condensing means is provided by first off-gas control system gas.

Cyclone separators 86 are disposed in gas discharge line 82 between vacuum pump 78 and gas outlet tubes 66,68 and are proximate in position to the juncture of gas outlet tubes 66,68 with gas discharge line 82. Temperature monitor 88 is disposed in gas discharge line 82 between vacuum pump 78 and cyclone separators 86. Temperature monitor 88 measures the temperature inside gas discharge line 82, thereby measuring the temperature of the volatilized components directed through gas discharge line 82. Control valve 92 is disposed in gas discharge line 82 between vacuum pump 78 and temperature monitor 88. Control valve 92 is adjusted to throttle the relative flow rates of the two volatilized components and other gases directed from head space 56 through gas discharge lines 82,84. Temperature monitor 90 is disposed in gas discharge line 84 between vacuum pump 78 and gas outlet tubes 66,68. Temperature monitor 90 measures the temperature inside gas discharge line 84, thereby measuring the temperature of the volatilized components directed through gas discharge line 84.

First off-gas control system 94 is disposed in gas discharge line 82 between control valve 92 and temperature monitor 88. First off-gas control system 94 condenses a portion of the volatilized component directed from head space 56 into gas discharge line 82. Condensate from first off-gas control system 94 is condensed by a suitable means, such as an indirect heat exchanger i.e. a shell-and-tube heat exchanger.

Gas discharge line 82 also includes temperature monitor 96 which is disposed in gas discharge line 82 between control valve 92 and first off-gas control system 94. Temperature monitor 96 measures the temperature of the non-condensed gases flowing in gas discharge line 82 from first off-gas control system 94. In a preferred embodiment, the temperature inside gas discharge line 82, as measured by temperature monitor 96, is about 100° F.

"Preferential separation," as that term is employed herein, means the separation of a high vapor pressure component from a low vapor pressure component, wherein a substantial portion of the volatilized high vapor pressure component is discharged from the housing through one outlet at the housing and a substantial portion of the volatilized low vapor pressure component is discharged through a separate outlet at the housing.

The valve position of control valve 92 is throttled to preferentially direct the volatilized high vapor pressure component from head space 56, through first outlet ports 70, in inlet end 14 of housing 12, into outlet tubes 66,68 and then, into gas discharge line 82. Control valve 92 is throttled to maintain the temperature inside of gas discharge line 82, as measured by temperature monitor 88, in a temperature range which causes a substantial portion of the volatilized high vapor pressure component to separate from the volatilized low vapor pressure component. In one embodiment, control valve 92 is adjusted to cause the temperature in gas discharge line 82 to stay significantly below the saturation temperature of the low vapor pressure component and to cause the temperature of the volatilized low vapor pressure component in gas discharge line 84, as measured by temperature monitor 90, to stay above the saturation temperature of the low vapor pressure component. As a result of throttling control valve 92, the volatilized low vapor pressure component is preferentially directed from head space 56, through outlet ports 72, in outlet end 16 of housing 12, into outlet tubes 66,68, and then into gas discharge line 84. Consequently, a substantial portion of the high vapor pressure component is preferentially separated from the low vapor pressure component.

In a particularly preferred embodiment, water volatilized as the high vapor pressure component, is substantially separated from oil, which is the volatilized low vapor pressure component, by adjusting the opening of control valve 92 to maintain the temperature inside of gas discharge line 82, as measured by temperature monitor 88, between about 220° F. and 250° F. Consequently, the temperature of the volatilized low vapor pressure component inside of gas discharge line 84, as measured by temperature monitor 90, is maintained generally above 250° F. and typically about 700° F.

In this embodiment to adequately separate water from oil and produce relatively oil-free water, the opening of control valve 92 is established to maintain a sufficiently low temperature inside gas discharge line 82, as measured by temperature monitor 88, thereby substantially ensuring that no significant amount of oil vapor will pass from matrix 42 into gas discharge line 82. However, the opening of control valve 92 is also set to maintain a sufficiently high temperature, as measured by temperature monitor 88, thereby removing a substantial portion of the water vapor from matrix 42 through gas discharge line 82.

In one embodiment gas discharge line 84 also includes a suitable separation means, such as cyclone separators 98 and a suitable condensing means, as provided by second off-gas control system 100. Cyclone separators 98 are disposed in gas discharge line 84 between temperature monitor 90 and gas outlet tubes 66,68 and are proximate in position to the juncture of gas discharge line 84 and gas outlet tubes 66,68.

Cyclone separators 86,98 substantially strip entrained solids and dust from the gases entering gas discharge lines 82,84 from gas outlet tubes 66,68. Cyclone separators 86,98 are also heated by suitable means, such as heat tracing, to substantially preclude the condensation of volatilized components from matrix 42 inside cyclone separators 86,98.

Second off-gas control system 100 is disposed in gas discharge line 84 between temperature monitor 90 and vacuum pump 78. Second off-gas control system 100 condenses a portion of the volatilized component directed from head space 56 into gas discharge line 84. Condensate from second off-gas control system 100 is condensed by a suitable means, such as an indirect heat exchanger or a shell and tube heat exchanger.

Temperature monitor 102 is also disposed in gas discharge line 84 between vacuum pump 78 and second off-gas control system 100. Temperature monitor 102 measures the temperature of the non-condensed gases flowing in discharge line 84 from the second off-gas control system 100.

In a particularly preferred embodiment, second off-gas control system 100 is operated in a manner suitable to condense the oil vapor in gas discharge line 84, such that no significant amount of oil vapor is discharged from second off-gas control 100, but to not condense the water vapor so that a substantial portion of the water vapor present will not condense. In this embodiment, the temperature measured by temperature monitor 102 is about 212° F.

Additionally, in another preferred embodiment, the preferential separation of the volatilized high vapor pressure component from the volatilized low vapor pressure component is enhanced through suitable testing of the condensates discharged from first off-gas control 94 and second off-gas control 100, followed by adjustments to the valve position of control valve 92 desired to alter the relative flow rates of volatilized high and low vapor pressure components through gas discharge lines 82,84.

Header 80 also includes third off-gas control system 104 and temperature monitor 106. Third off-gas control system 104 is disposed between vacuum pump 78 and gas discharge lines 82,84. Third off-gas control system 104 condenses at least a portion of any high vapor pressure component not condensed by first and second off-gas control systems 94,100. Temperature monitor 106 is disposed between vacuum pump 78 and third off-gas control system 104. Temperature monitor 106 measures the temperature of the non-condensed gases in header 80 flowing out of third off-gas control system 104.

In a particularly preferred embodiment, wherein the high vapor pressure component is water and the low vapor pressure component is oil, third off-gas control system 104 is operated to condense at least a portion of non-condensed water vapor discharged from first and second off-gas control systems 94,100. In this embodiment, the temperature inside header 80 as measured by temperature monitor 106 is typically below 50° F.

In a further embodiment, baffles 108 are disposed within head space 56, above screw conveyors 28,30, below gas inlet tube 58, and between gas outlet tubes 66,68. Baffles 108 are disposed perpendicular to a major axis of screw conveyors 28,30, gas inlet tube 58, and gas outlet tubes 66,68. Baffles 108 significantly impede confluence of the volatilized high and low vapor pressure components above matrix bed 50 by substantially restricting migration of the volatilized components from locations in head space 52 proximate to the locations at which the components were volatilized. This impedance of volatilized component confluence thereby enhances the separation of the two volatilized components directed into gas discharge lines 82,84 through the gas outlet tubes 66,68.

Preferably, the vacuum attained in head space 56 through gas discharge lines 82,84 of header 80 and gas outlet tubes 66,68 by vacuum pump 78 reduces the pressure in housing chamber 24 in an amount sufficient to prevent significant leakage of volatilized components to the atmosphere. In a particularly preferred embodiment, the pressure in housing chamber 24 is in the range of up to about 0.5 inches of water below atmospheric pressure.

Matrix 42, from which at least a portion of the high and low vapor pressure components have been removed, is then directed through housing outlet 20 by gravitational force and into air lock 110. Matrix 42 is then discharged from thermal removal system 10 into a suitable matrix receiving means, such as bin 112.

Housing 12, lid 22, screw conveyors 28,30, gas inlet tube 58, and gas outlet tubes 66,68 are formed of materials which are suitable for contact with volatilizable component-containing matrices at temperatures of up to about 540° C. Examples of suitable materials of construction include 304-type stainless steel, 316-type stainless steel, incoloy, hastelloy, etc. Preferably, screw conveyors 28,30 are formed of stainless steel having a nickel content which is at least that of 304-type stainless steel.

Figure 2:
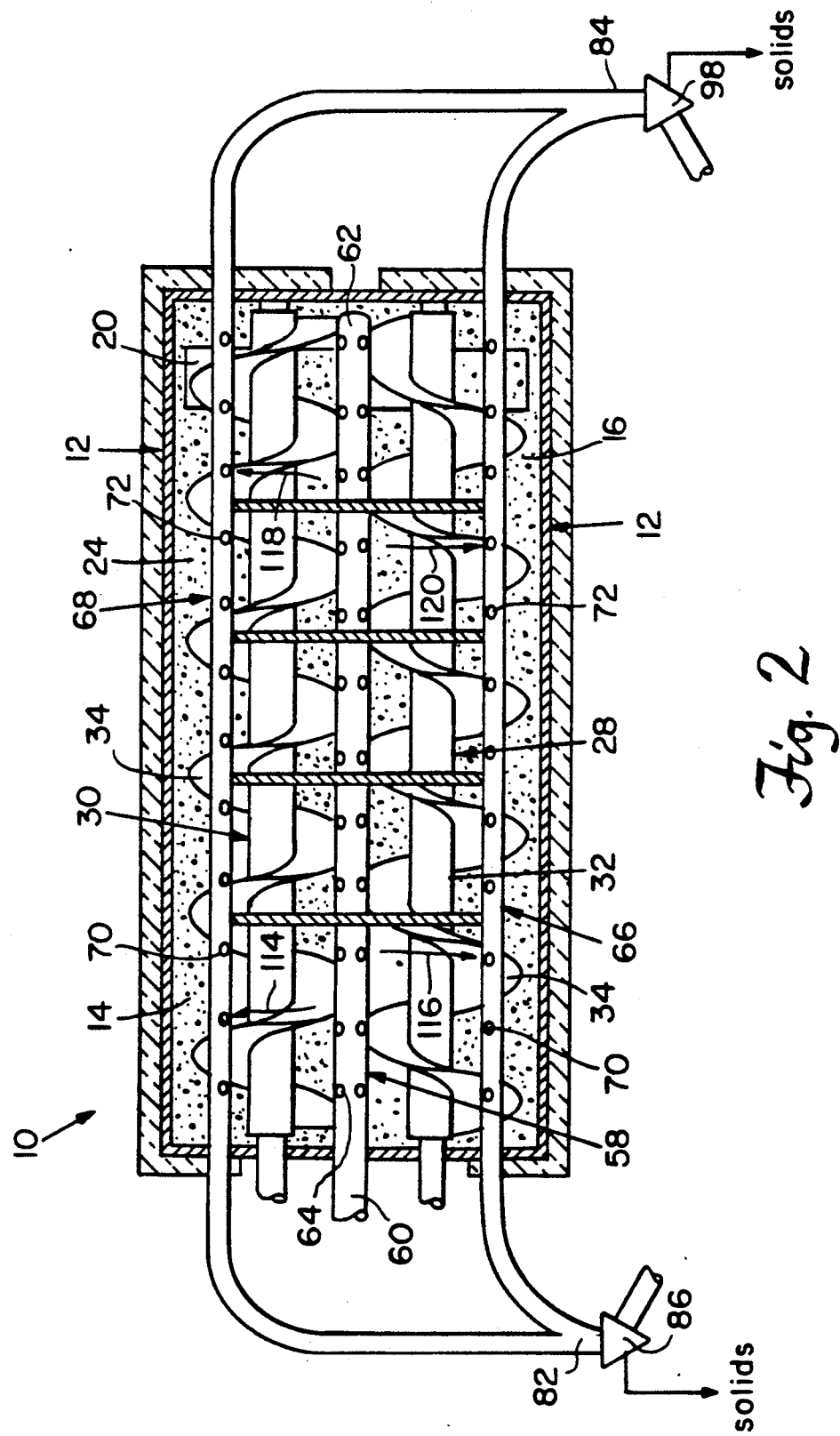
FIG. 2 is a plan view taken along line II—II of the thermal removal system illustrated in FIG. 1.

As can be seen in FIG. 2, gas inlet tube 58 extends along a substantial portion of the length of housing chamber 24 and is disposed centrally to the width of housing chamber 24 above screw conveyors 28,30. Gas outlet tubes 66,68, extend within head space 56 of housing chamber 24 on opposite sides of gas inlet tube 58 and along the length of housing 12 from inlet end 14 to outlet end 16. Portions of gas outlet tubes 66,68 protrude through inlet end 14 and through outlet end 16. The portions of gas outlet tubes 66,68 within head space 56 are also disposed outwards of screw conveyors 28,30. Outlet ports 70,72 in gas outlet tubes 66,68 are disposed in close proximity to apertures 64 in gas inlet tube 58.

Hot gas directed into gas inlet tube 58 is discharged into housing chamber 24 through apertures 64 so that hot gas is discharged into housing chamber 24 along a substantial portion of the length of housing 12. Hot gas discharged through apertures 64 passes over matrix bed 50 toward outlet ports 70,72 at gas outlet tubes 66,68 in a direction substantially perpendicular to the path of matrix 42. The hot gas flow, from apertures 64 to first outlet ports 70 at gas outlet tubes 66,68, that preferentially transports the volatilized high vapor pressure component from matrix bed 50 into gas outlet tubes 66,68, is shown as arrows 114,116.

The flow of hot gas, from apertures 64 to second outlet ports 72 at gas outlet tubes 66,68, that transports preferentially the volatilized low vapor pressure component from matrix bed 50 into gas outlet tubes 66,68, is shown as arrows 118,120.

Screw conveyor 28 has a left-hand orientation and screw conveyor 30 has a right-hand orientation, whereby counter-rotation of screw conveyors 28,30 causes matrix 42 in matrix bed 50 to be conveyed in a single direction through housing chamber 24 to housing outlet 20. Flights 34 of screw conveyor 28 are in non-interfering relation with flights 34 of screw conveyor 30.

Figure 3:
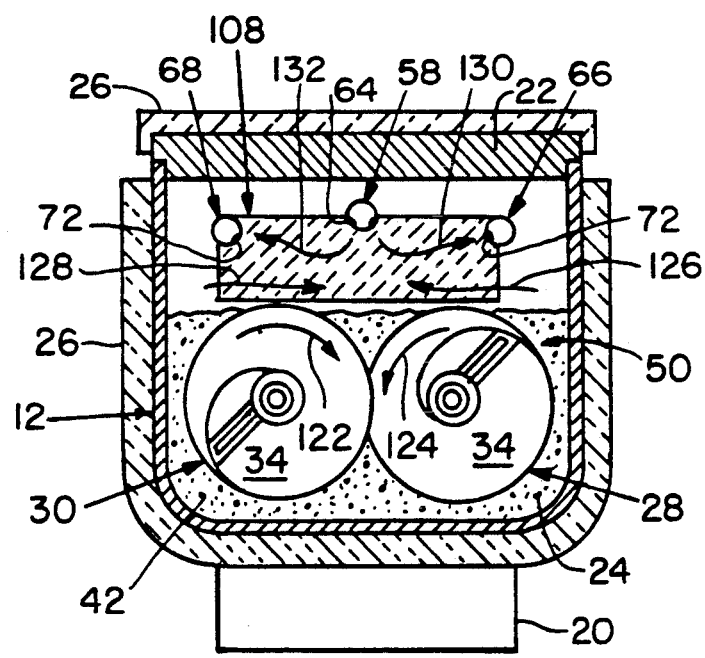
FIG. 3 is a section view taken along line III—III of the thermal removal system illustrated in FIG. 1.

FIG. 3 is a section view of thermal removal system 10 taken along line III—III of FIG. 1. Flights 34 of screw conveyor 28 slightly overlap flights 34 of screw conveyor 30. Arrows 122,124, indicate the direction of rotation of screw conveyors 28,30, respectively. Rotation of screw conveyors 28,30, in the directions indicated by arrows 122,124, can cause matrix 42 in matrix bed 50 to move at the top of matrix bed 50 toward the center of housing chamber 24 as indicated by arrows 126,128.

Volatilizable components which have been volatilized by heat conducted from screw conveyors 28,30 to matrix bed 50 enter head space 56. The volatilized components are thereby directed into head space 56. Volatilized low vapor pressure component in head space 56 is then transported through outlet ports 70,72 into gas outlet tubes 66,68 by reducing the gaseous pressure within head space 56 by the flow of hot gas from apertures 64 of gas inlet tube 58 over matrix bed 50 and into outlet ports 70,72 in gas outlet tubes 66,68. At least a portion of the high and low vapor pressure volatilized components are preferentially directed to outlet ports 70,72, respectively, proximate to the surface of matrix bed 50 and proximate to the location along the length of housing chamber 24 from which the volatilizable components were volatilized from matrix bed 50 into head space 56.

The volatilized components are then preferentially directed through outlet ports 70,72, respectively, into gas outlet tubes 66,68, and out of housing 12. Arrows 130,132, indicate the direction of flow of hot gas from apertures 64 of gas inlet tube 58, over matrix bed 50, through head space 56, and into second outlet ports 72 at gas outlet tubes 66,68.

As screw conveyors 28,30, continue to rotate, volatilizable component-containing matrix 42 which has been introduced into housing chamber 24, is directed to housing outlet 20. The volatilized components enter head space 56 and are transported out of head space 56, by hot gas discharged from apertures 64 over matrix bed 50, through outlet ports 70,72 into gas outlet tubes 66,68. The partial pressure of volatilized components in head space 56 is thereby maintained at a level that is sufficiently low to prevent significant leakage of volatilized volatilizable components from housing 12 as matrix 42 is directed along matrix bed 50 to housing outlet 20.

Equivalents

Those skilled in the art will recognize, or be able to ascertain using no more than routine experimentation, many equivalents to specific embodiments of the invention described specifically herein. Such equivalents are intended to be encompassed in the scope of the following claims.

What is claimed is:

1. An apparatus for preferentially separating a high vapor pressure component from a low vapor pressure component, wherein at least a portion of each volatilizable component is volatilized from a matrix, comprising:
   a) a housing having
      i) a housing inlet,
      ii) a housing outlet,
      iii) a one first gas outlet, and
      iv) at least one second gas outlet, which is sufficiently remote from the first gas outlet to enable preferential separation of a volatilized high vapor pressure component from a volatilized low vapor pressure component within the housing means;
   b) conveying means for conveying the matrix from the housing inlet through the housing to the housing outlet;
   c) volatilizing means for volatilizing at least a portion of the high vapor pressure and the low vapor pressure components of the matrix within said housing; and
   d) means for preferentially directing said volatilized high vapor pressure component out of the housing through said first gas outlet and for preferentially directing the volatilized low vapor pressure component out of the housing through the second gas outlet, thereby preferentially separating the high vapor pressure component from the low vapor pressure component of the matrix.

2. The apparatus of claim 1, further including at least one gas outlet tube which is disposed within the housing, the gas outlet tube having a first end which is connected to the first gas outlet and a second end which is connected to the second gas outlet, and further defining at least one outlet port between the first and second ends, whereby the volatilized high and low vapor pressure components, which are directed out of the housing, are conducted through said aperture and said gas outlet tube to the first and second gas outlets, respectively.

3. The apparatus of claim 2, further including at least one gas inlet tube which is disposed within the housing, whereby a hot gas can be discharged from the gas inlet tube above the matrix along a substantial portion of the length of the housing for transport of the volatilized high and low vapor pressure components into the gas outlet tube.

4. An apparatus for preferentially separating a high vapor pressure component from a low vapor pressure component, wherein at least a portion of each volatilizable component is volatilized from a matrix, which is disposed within a housing, comprising:
   a) a housing having
      i) a housing inlet,
      ii) a housing outlet,
      iii) at least one gas inlet tube for discharging a hot gas from the gas inlet tube above the matrix along at least a substantial portion of the length of the housing, and
      iv) at least one gas outlet tube for receiving the hot gas and the high and low vapor pressure components, the gas outlet tube having a first end connected to a first gas outlet of the housing and a second end connected to a second gas outlet of the housing for substantially separating discharge of the volatilized high and low vapor pressure components from the housing through the first and second gas outlets, respectively;
   b) conveying means for conveying the matrix from the housing inlet through the housing to the housing outlet;
   c) volatilizing means for volatilizing at least a portion of each of the high vapor pressure and the low vapor pressure components of the matrix within said housing; and
   d) means for preferentially directing the volatilized high vapor pressure component out of the housing through the first end of the gas outlet tube and the first gas outlet, and for preferentially directing the volatilized low vapor pressure component out of the housing through the second end of the gas outlet tube and the second gas outlet, thereby preferentially separating at least a portion of the high vapor pressure component from the low vapor pressure component of the matrix.

5. An apparatus of claim 4, wherein the conveying means includes at least one screw conveyor which is disposed within the housing.

6. An apparatus of claim 5, wherein the gas inlet tube is disposed substantially parallel to a major axis of the screw conveyor.

7. An apparatus of claim 6, wherein the gas outlet tube is disposed substantially parallel to a major axis of the gas inlet tube.

8. An apparatus of claim 7, wherein the means for preferentially directing the volatilized high vapor pressure component and the volatilized low vapor pressure component out of the housing through the first and second ends, respectively, of the gas outlet tube includes:
   a) vacuum means for applying vacuum to the gas outlet tube;
   b) a header which includes a wye having at least two gas discharge lines, wherein the gas discharge lines are connected to the first and second ends of said gas outlet tube, through which said vacuum is applied to the gas outlet tube;
   c) flow-control means of controlling relative flow rates of the volatilized components through the gas discharge lines of the header;
   d) separation means for removing at least a portion of a solid component of a gas stream discharged from the housing through the gas outlet tube; and
   e) condensing means for condensing the volatilized components in the gas discharge lines.

9. An apparatus of claim 8, wherein the gas outlet tube defines outlet ports at positions along a length of the gas outlet tube through which the volatilized high and low vapor pressure components are directed into the gas outlet tube.

10. An apparatus of claim 9, wherein the flow-control means further includes:
   a) at least one monitoring means for monitoring the temperature of the volatilized components in each gas discharge line; and
   b) a valve disposed at the gas discharge lines for controlling the relative flow rates of the volatilized components through the gas discharge lines.

11. An apparatus of claim 10, wherein at least one baffle is disposed in the housing and substantially perpendicular to a major axis of the gas inlet tube, the gas outlet tube and the conveyor for significantly impeding confluence of the volatilized high vapor pressure and low vapor pressure components above the matrix.

12. An apparatus of claim 10, wherein two gas outlet tubes are disposed within the housing.

13. An apparatus of claim 12, wherein the screw conveyor defines a conveyor conduit for conducting a hot medium through the conveyor to heat the conveyor to a temperature sufficient to volatilize at least a portion of each of the high vapor pressure component and the low vapor pressure component of the matrix.

14. An apparatus of claim 13, wherein a first screw conveyor has a right-hand orientation and a second screw conveyor has a left-hand orientation, whereby rotation of the screw conveyors in opposite directions conveys the matrix from the housing inlet through the housing to the housing outlet.

15. A method for preferentially separating a high vapor pressure component from a low vapor pressure component, wherein at least a portion of each component is volatilized from a matrix, comprising the steps of:
   a) conveying the matrix through a housing from a housing inlet at an inlet end of the housing to a housing outlet at an outlet end of the housing;
   b) heating the matrix to a temperature which is sufficient to volatilize at least a portion of each of the high vapor pressure component and the low vapor pressure component;
   c) preferentially directing the volatilized high vapor pressure component out of the housing through a first gas outlet at the housing; and
   d) preferentially directing the volatilized low vapor pressure component out of the housing through a second gas outlet, which is disposed at the housing and which is sufficiently remote from the first gas outlet to enable preferential separation of the volatilized high vapor pressure component from the volatilized low vapor pressure component, thereby preferentially separating the volatilized high vapor pressure component from the volatilized low vapor pressure component of the matrix.

16. In a method for removing least a portion of each of a high vapor pressure component and a low pressure component from a matrix by conveying the matrix through a housing from an inlet end to an outlet end of the housing and by heating the matrix in an amount sufficient to volatilize at least a portion of each of said components:
   The improvement comprising preferentially directing the volatilized high vapor pressure component out of the housing through a first gas outlet at the housing and preferentially directing the volatilized low vapor pressure component out of the housing through a second gas outlet at the housing, the second gas outlet being sufficiently remote from the first gas outlet to enable preferential separation of the volatilized high vapor pressure component from the volatilized low pressure component, thereby preferentially separating the volatilized high vapor pressure component from the volatilized low vapor pressure component of the matrix.

* * * * *